ically, from flue gases. Sulfurous components of the waste gases in particular, but also heavy metals contained therein, can be separated at a very high degree of separation by fractional condensation when certain parameters are followed. The energy withdrawn from the waste gases during condensation is available as process heat.

United States Patent [19]

Faatz

[11] 4,454,100
[45] Jun. 12, 1984

[54] CONDENSATION PROCESS FOR SEPARATING AIR POLLUTANTS FROM WASTE GASES, AND SPECIFICALLY FROM FLUE GASES

[75] Inventor: Otto Faatz, Salzgitter, Fed. Rep. of Germany

[73] Assignee: Toschi Produktions-GmbH, Bremen, Fed. Rep. of Germany

[21] Appl. No.: 439,414

[22] Filed: Nov. 5, 1982

[30] Foreign Application Priority Data

May 5, 1982 [DE] Fed. Rep. of Germany ....... 3017133
Oct. 12, 1982 [DE] Fed. Rep. of Germany ....... 3237699

[51] Int. Cl.$^3$ .......................... B01D 47/00; B01J 8/00; C01B 21/00; C01B 17/00
[52] U.S. Cl. ..................... 423/210; 423/235; 423/242; 423/390; 423/522; 55/23; 55/68; 55/73
[58] Field of Search .................. 423/230, 235, 235 D, 423/239, 239 A, 242 A, 242 R, 210 M, 240 R, 390, 522; 55/23, 73, 24, 68

[56] References Cited

U.S. PATENT DOCUMENTS

| 2,862,789 | 12/1958 | Burgess | 423/242 |
| 2,889,687 | 6/1959 | Ishizuka | 55/68 |
| 3,733,393 | 5/1973 | Covillavel et al. | 423/522 |
| 3,905,784 | 9/1975 | Kelleher | 55/68 X |
| 3,987,153 | 10/1976 | Stiles | 423/522 |
| 4,284,609 | 8/1981 | deVries | 423/242 |

FOREIGN PATENT DOCUMENTS 2822808 11/1978 Fed. Rep. of Germany.
2931546 2/1981 Fed. Rep. of Germany ...... 423/235

*Primary Examiner*—Gregory A. Heller
*Attorney, Agent, or Firm*—Wood, Herron & Evans

[57] ABSTRACT

A condensation process for separation of air pollutants from waste gases and, specifically, from flue gases. Sulfurous components of the waste gases in particular, but also heavy metals contained therein, can be separated at a very high degree of separation by fractional condensation when certain parameters are followed. The energy withdrawn from the waste gases during condensation is available as process heat.

11 Claims, 1 Drawing Figure

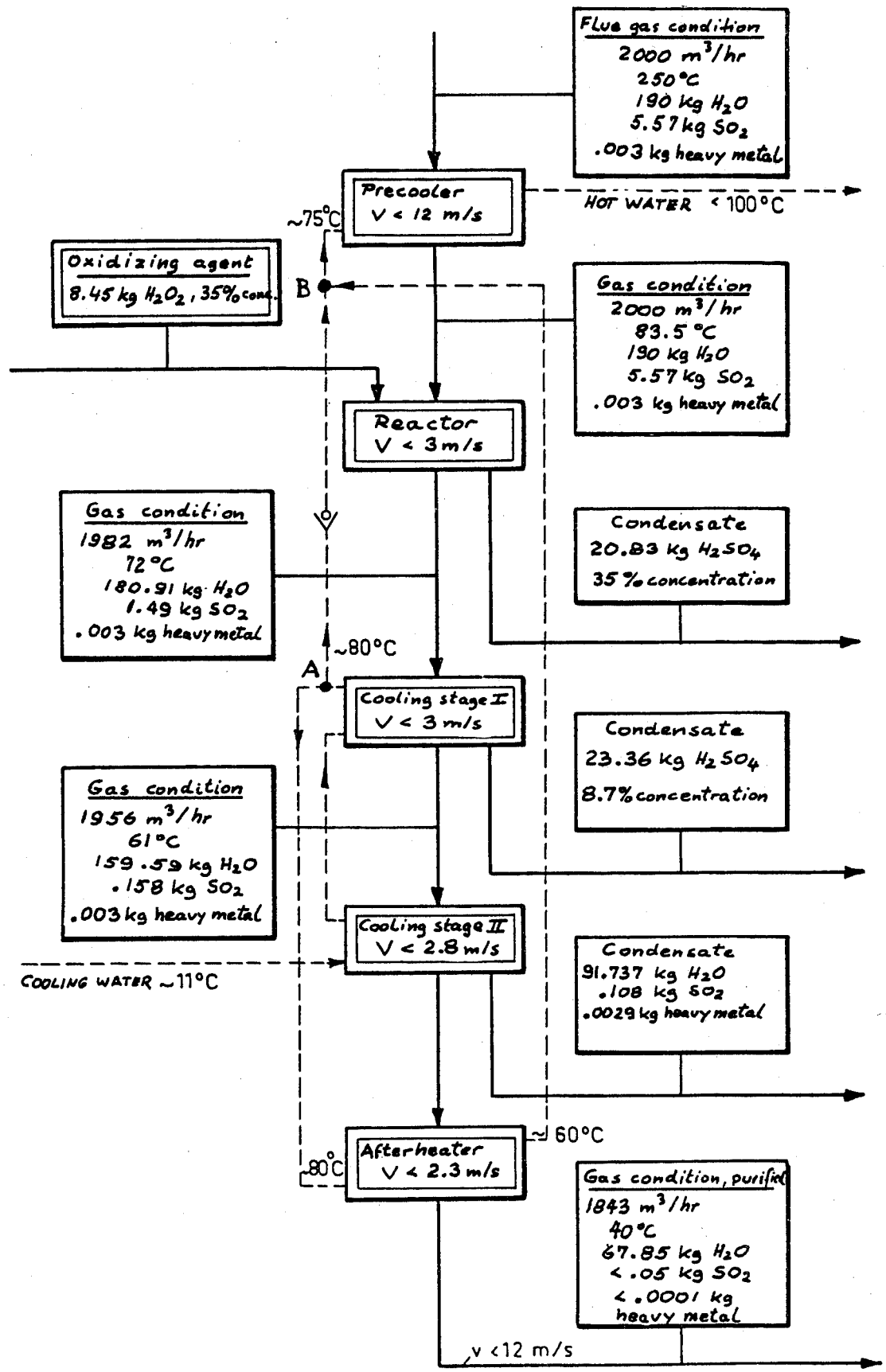

CONDENSATION PROCESS FOR SEPARATING AIR POLLUTANTS FROM WASTE GASES, AND SPECIFICALLY FROM FLUE GASES

The invention concerns a condensation process for the separation of air pollutants from waste gases, and specifically, from flue gases.

Waste gases from industrial processes usually contain substances which possibly should not be left in these waste gases, whether for the reason that these substances may be used for other purposes, or for the reason that the release of those substances into the atmosphere would constitute environmental pollution. Air pollutants and/or airborne substances contained in flue gases partly form highly aggressive acids in the temperature range below approximately 160° C. These acids, at sufficient concentrations, may cause environmental harm when released to the atmosphere, or the destruction of technical systems by corrosion when within those systems.

Various processes are known for the separation of such air pollutants from waste gases. The processes are basically classified into those which separate the pollutants far above the dew point temperature, and into those where the waste gases are treated by condensation.

With the first mentioned high temperature type processes, the corrosion problems are essentially manageable, and for that reason these processes are increasingly used. But these high temperature processes do present other problems. One problem lies in the required size of the equipment components that are needed. Another problem lies in a high accrual of gypsum serving the neutralization of the sulfurous waste gas components. And a further problem lies in the fact that the separation efficiency still leaves much to be desired. In waste gases resulting from the burning of fossil fuels, a sulfur dioxide content of, e.g., 3 g per $m^3$, must be expected in the waste gas. Separating this sulfur dioxide down to a desirable residual content of about 600 to 800 $mg/m^3$ is extremely expensive.

The processes employing condensation techniques on the waste gases have so far failed to prove themselves in practice due to corrosion problems. Many suggestions have been made, especially in conjunction with heat reclamation from the waste gases of boiler systems, which result in a lowering of the waste gases temperature and which accept an at least partial condensation as a trade-off. However, the acids forming thereby result in the previously mentioned corrosion problems, which by economical standards are not being managed. When considering, e.g., a condensation process according to German laid open patent application No. 28 22 808, it is believed that the separation efficiency cannot be too high, and that a milk of lime filter is still used for neutralization of the sulfuric and/or nitric acid that is formed. The gypsum quantity that accrues during use of this method is so large that an industrial scale application of this process becomes prohibitive even when the corrosion problems are managed.

The primary objective of this invention, therefor, is to provide a process employing the condensation principle which reduces the corrosion problems considerably, while likewise distinctly raises the separating efficiency.

In accord with this objective, this invention is directed to a condensation process for separating air pollutants from waste gases, and specifically from flue gases, in which the waste gases are fractionally condensed in several successive stages at decreasing temperature, and in which the temperature of each stage is adjusted to the condensation point of one polluting substance each or of a group of polluting substances, the accruing condensate being drawn off at each stage. A preferred process in accord with this invention is a process where the waste gases are adjusted to a temperature of about 100°–72° C. with a water vapor content of 30–400 $g/m^3$; where the temperature and water vapor adjusted gases are subsequently mixed with an oxidizing agent in an amount such that, based on the nitrogen oxide and/or sulfur content of the waste gases, a stoichiometric ratio of $\lambda=0.8$–2.0 preferably under $\lambda=1.2$ and preferably $\lambda=0.8$ will be obtained so that the resulting acids can be and are then drawn off in a liquid state; where the waste gases are subsequently cooled in at least one other stage below the saturation point of the water vapor; where at each stage the resulting, pollutant-containing condensate is drawn off; and where finally the purified gases are vented into the atmosphere. One preferred aspect of the invention is to catalytically support the upward oxidization from sulfur dioxide to sulfur trioxide. Other preferred aspects of the invention are described below.

Among the major advantages of the process of this invention is the fact that the sulfuric acid and/or nitric acid separated by fractional condensation in the first stage is of a high concentration, and thus less aggressive or corrosive, relative to the low-concentration acids formed by state of the art processes. Another important advantage of this process is the achievable high degree of separation of heavy metals contained in the waste gases. This advantage is believed attributable to the comparatively low cooling of the gases below the dew point of water in the last cooling stage.

The invention is explained hereafter with the aid of the example referred to in attached flow chart. The gas quantities named there and in the following are standard $m^3$ as defined in German industry standard DIN 1343, viz.: at 0° C. and 14.706 psi.

The example concerns the purification of the flue gases of an oil-fired steam generator. Its burner produced an hourly maximum of 2000 $m^3$ of flue gases at 250° C., the gases contained 190 kg of water, 5570 g of sulfur dioxide and 3 g of heavy metals. The flow velocity was less than 12 m/sec. The equipment used was commercially available and can be obtained from TOSCHI PRODUKTIONS GMBH of BREMEN/WEST-GERMANY under the model numbers mentioned hereinafter.

The flue gases are first passed through a precooler or heat exchanger, MODEL A1VK, for reducing the temperature to 80° to 85° C., preferably 83.5° C., and the flow velocity below 3 m/sec. Cooling water with an entering temperature of about 75° C. may be used for cooling the gases, there being no contact between the cooling water and the flue gases. Because of this preconditioning, the flue gases temperature is dropped below the sulfuric acid dew point, but still far above the dew point of water.

The preconditioned flue gases are then passed into a reactor, MODEL A1R, at a pressure of 0.5 to 2.5 bars and an oxidizing agent of hydrogen peroxide of between about 5 and 35% concentration in water is simultaneously sprayed thereinto at a rate of 8.45 kg per hr in concurrent flow in the same direction or in a direction transverse to the fuel gas flow that is, one of cross and equidirectional flow. The oxidizing agent is dosed so that the SO₂ amount forming at an average boiler output will be oxidized practically completely for reasons of economy. An upward oxidization of the sulfur dioxide to sulfur trioxide takes place in the reactor, and this combines with the water present in steam form to produce a sulfuric acid of 35% concentration. The respective equations are:

$$2H_2O_2 = 2H_2O + O_2$$

$$2SO_2 + O_2 = 2SO_3$$

$$2SO_3 + 2H_2O = 2H_2SO_4$$

The sulfuric acid is drawn off the reactor at a rate of 20.83 kg/hr.

The decomposition of the hydrogen peroxide, and the combination of sulfur dioxide and oxygen, cause the release of heat in the reactor. In order to keep the gases temperature in the reactor within a desired range, the cooling water leaving the precooler may be also passed through a heat exchanger associated with the reactor for additional cooling of the gases.

The gases leaving the reactor at a rate of 1982 m³/hr., with a water content of 180.91 kg, a temperature of 72° C., and a flow velocity below 3 m/sec., and those gases still contain a remainder of 1.49 kg sulfur dioxide as well as all the heavy metals. These gases flow through a first cooling stage or heat exchanger, MODEL A1WT1 through which pass preheated cooling water that is preheated at a second cooling stage, the cooling water not contacting the gases flow. The cooling water that is exhausted from the first cooling stage is withdrawn at a temperature of about 80° C. Within the first cooling stage, 23.36 kg of sulfuric acid of 8.7% concentration is separated as condensate. The sulfuric acid accural is based on boiler operating times with above-average boiler ouput. This condensate may contain hydrogen chloride as well, provided there are chlorine ions in the waste gas.

The gases then proceed into a second cooling stage, MODEL A1WT2 at a rate of 1956 m³ per hour, a temperature of 61° C., a flow velocity of about 2.8 m/sec., and with contents of 158.59 kg of water, 0.158 kg of sulfur dioxide, and the full 3 g of heavy metals. The gases are further cooled in the second cooling stage to about 30°-20° C. The resulting condensate contains 91–737 kg of water, 0.108 kg of sulfur dioxide and, with 2.9 grams, nearly the entire quanitity of heavy metals.

The gases in the present example, which after the second cooling stage are in a purified state, are subjected to an afterheating for bringing the relative humidity to about 85%, at which the gases can be released into the atmosphere without the use of large smoke stacks. The actually used equipment was a MODEL A1NH heat exchanger. The purified gases accrue at 1843 m³ per hour; the gases have a temperature of 40° C. and contain 67.85 kg of water. The flow velocity of the purified waste gases is adjusted, in the present embodiment, to about 12 m/sec. Of the major harmful substances there are only about 50 grams of sulfur dioxide and 0.1 gram of heavy metal left in the gases. Specifically, the sulfur dioxide content is less than one-tenth of the limit value which at the present time is required by West German law.

Turning to an advantageous side effect of this condensation process, namely, heat recovery, the present embodiment provides the following economy. With a fuel having an upper heating value of 18,372.97 BTU/lb, the waste gases have 3,975.54 BTU/lb prior to conditioning according to this process. Allowing for the heat of reaction and the fractional condensation up to an ultimate temperature of 20° C. (without afterheating), 3,042.09 BTU/lb are recovered. Only 5.5% of the energy employed is continuously lost to the atmosphere.

As to the required equipment for carrying out this process, due to the considerable lowering temperature of the exhausting gases and in view of the pressure losses occurring in the coolers, it will normally be suitable to arrange a blower behind the afterheater. The reactor and, specifically, the first cooling stage—as far as they are exposed to the waste gases and/or in the area of the condensate collectors—must be constructed from a corrosion-resistant material. Usable for these purposes are, e.g., glass or polytetrafluoroethylene (PTFE). It is again emphasized that all components of the required equipment are known in the art and are commercially availably from various sources. This also applies to the catalysts mentioned above and in the claims, they are of the type comprising a grid made from vanadiumpentoxid or platinum respectively, which can be electrically used by the sulfuric acid manufacturers.

The conditioning of waste gases prior to entering the reactor, in the case of flue gases, means a considerable cooling. If it is desired to purify low temperature waste gases, the conditioning would then require heating and moistening which precedes the fractional condensation.

The spray introduction of the oxidizing agent into the conditioned waste gases offers the advantage of an optimum efficiency and represents a very economical type of process. It is also possible to introduce an oxidizing agent in the waste gases before conditioning.

For the sake of completeness, it is further pointed out that the respective condensates may be used subsequently. The higher-concentration sulfuric acid often can be used immediately; the lower-concentration sulfuric acid, prior to its use, is converted to a higher concentration type. And using a reverse osmosis system, the water contained in the condensate can be conditioned, to about 93%, to demineralized and deionized water which is well suited as fresh water for the boiler. Remaining condensate concentrates can be subjected to an electrochemical treatment. The heavy metals can be reclaimed as electrolytes or in solid form.

As to the required cooling circuit water is used throughout the embodiment although other fluids including air are suitable. In the flow chart the cooling circuit is indicated by broken lines and arrows. Accordingly, cool water of approximately 11° C. is introduced into a cooling inlet of the second cooling stage and is withdrawn therefrom to be passed on to the cooling fluid entry of the first cooling stage. The amount of fluid is adjusted such that the waste gas within heat exchanger 2 is cooled from approximately 61° C. down to approximately 20°-30° C. The cooling fluid is then passed through the first cooling stage so as to cool the oncoming waste gas from approximately 72° C. down to approximately 61° C. In order to achieve this cooling step it can be necessary to either provide a by-pass between the fluid inlet and fluid outlet of the first cooling stage so as to by-pass some of the cooling fluid or to additionally feed into the fluid inlet a certain amount of cooler cooling fluid. Respective by-passes or cool fluid inlets can be provided throughout the circuit where required.

The cooling fluid leaving the respective outlet at the first cooling stage is divided into a first substream and a second substream respectively, both having a temperature of approximately 80° C. The first substream is passed through a check valve A to a connection point B. The second substream is connected to the fluid inlet of the afterheating stage for heating up the purified gas from between 20°-30° C. to approximately 40° whereby the cooling fluid is reduced in temperature from approximately 80° C. to 60° C. The outlet of the afterheater is connected to connecting point B, where it is mixed with the first substream so that the resulting temperature is approximately 75° C. The cooling fluid is then passed to the fluid inlet of the precooling or conditioning stage from which it is withdrawn at a temperature of shortly under 100° C. In order to maintain a proper fluid flow within the cooling circuit pumps may be employed where required. Other modifications of the cooling circuit including the provision of individual cooling circuits for some of the cooling stages are at the discretion of a person of ordinary skill.

The energy contained within the cooling fluid and available at the final fluid outlet can be used for various purposes including a condensation step for the sulfuric acid so as to further increase its concentration.

Having described in detail the preferred embodiment of my invention, I claim:

1. A condensation process for separating air pollutants from waste gases, and especially from flue gases, said pollutants including at least one member selected from the group consisting of sulfur oxides, nitrogen oxides and heavy metals, comprising the steps of adjusting the waste gases to a temperature of about 72°-100° C. with a water vapor content of about 30 to 400 g/m$^3$, thereafter, and at a pressure of about 0.5 to 2.5 bars, mixing an aqueous oxidizing agent which reacts with at least one of said pollutants to form a liquid state acid with the waste gases in a quantity such that, based on the either nitrogen oxide or sulfur content or both of the waste gases, a stoichiometric ratio of $\lambda=0.8$ to 2.0 is obtained, drawing off the liquid state acid formed in the mixing step, and thereafter cooling the waste gases in at least one further stage below the saturation point of the water vapor, thereby permitting the condensate with pollutants at each stage to be drawn off, and the purified gas vented to atmosphere.

2. A process according to claim 1 comprising the further step of adjusting the waste gases to a temperature of between 80° to 85° C., preferably 83.5° C. prior to the introduction of the oxidizing agent.

3. A process according to claim 1, the oxidizing agent being added at a waste gases flow velocity of less than 3 m/s.

4. A process according to claim 1 comprising the further step of adjusting the humidity to about 85 percent.

5. A process according to claim 1, the oxidizing agent being H$_2$O$_2$ with a concentration in water between about 5 and 35%.

6. A process according to claim 1 comprising the further steps of atomizing the oxidizing agent, feeding the oxidizing agent into the waste gases in one of cross and equidirectional flow.

7. A process according to claim 1, the stoichiometric ratio being under $\lambda=1.2$, preferably $\lambda=0.8$.

8. A process according to claim 1 comprising the further step of cooling the waste gases, upon withdrawal of either the sulfur oxide or the nitrogen oxide, pollutants or both in a first cooling stage sufficiently down into the range of the water vapor saturation that a condensate with a content of hydrochloric acid is obtained, removing the first stage condensate from the waste gas, thereafter cooling the waste gases in at least one other cooling stage to approximately atmospheric temperature, and drawing off the second stage condensate which contains heavy metal from the waste gases.

9. A process according to claim 8 comprising the further step of adjusting the waste gases to a temperature above the water dew point, preferably to about 72° C. at the entrance to the first cooling stage, and to a temperature shortly below water vapor saturation, preferably to about 61° C. at the entrance to the second cooling stage.

10. A process according to claim 1 comprising the further step of afterheating the purified gases to a condition of about 65 to 90%, preferably to 85% relative humidity prior to release into the atmosphere.

11. A condensation process for separating a plurality of air pollutants from waste gases, said waste gases including either sulfur oxides or nitrogen oxides or both and heavy metals, said process comprising adjusting the waste gases to a temperature of about 72°-100° C. with a water vapor content of 30-400 g/m$^3$ thereafter at a pressure of about 0.5 to 2.5 bars, mixing hydrogen peroxide with said waste gases in a quantity such that based on the either nitrogen oxide or sulfur oxide content or both of the waste gases, a stoichiometric ratio of $\lambda=0.8$ to 2.0 is obtained, drawing off the liquid state acid formed in the mixing step, fractionally condensing said waste gases in several successive condensing stages with decreasing temperatures, the temperature of said first stage being adjusted to from about 20° C. to about 30° C., the temperature of each subsequent stage being adjusted to the condensation point of one pollutant or a group of pollutants, drawing off the condensate accruing in each stage, and wherein the temperature of the waste gases in a last condensing stage is adjusted to below the dew point of water, thereby separating the heavy metal from said waste gases.

* * * * *